United States Patent [19]

Leifeld

[11] Patent Number: 4,742,879
[45] Date of Patent: May 10, 1988

[54] APPARATUS FOR MEASURING QUANTITIES OF FIBER FED TO A TEXTILE MACHINE

[75] Inventor: Ferdinand Leifeld, Kempen, Fed. Rep. of Germany

[73] Assignee: Trützschler GmbH & Co. KG, Monchen-Gladbach, Fed. Rep. of Germany

[21] Appl. No.: 911,919

[22] Filed: Sep. 26, 1986

[30] Foreign Application Priority Data

Oct. 1, 1985 [DE] Fed. Rep. of Germany ....... 3534933

[51] Int. Cl.⁴ ...................... G01G 19/52; G01G 13/04
[52] U.S. Cl. ...................... 177/50; 177/121; 364/567
[58] Field of Search ............ 364/470, 567, 568; 177/50, 16, 121

[56] References Cited

U.S. PATENT DOCUMENTS

| | | | |
|---|---|---|---|
| 2,702,177 | 2/1955 | Jee et al. | 177/121 X |
| 3,518,430 | 6/1970 | Davis | 364/575 UX |
| 3,936,665 | 2/1976 | Donoghue | 364/568 X |
| 3,939,929 | 2/1976 | Hidaka et al. | 177/121 |
| 4,056,714 | 11/1977 | Al-Shaikh et al. | 364/568 X |
| 4,108,344 | 8/1978 | Dahlberg | 177/16 X |
| 4,133,455 | 1/1979 | Moser | 177/16 X |
| 4,506,413 | 3/1985 | Leifeld . | |
| 4,512,061 | 4/1985 | Hartmannsgruber et al. | 364/470 X |

FOREIGN PATENT DOCUMENTS

| | | |
|---|---|---|
| 122717 | 10/1984 | European Pat. Off. . |
| 2031788 | 2/1972 | Fed. Rep. of Germany . |
| 2905589 | 8/1980 | Fed. Rep. of Germany . |
| 2912576 | 7/1982 | Fed. Rep. of Germany . |
| 983084 | 2/1965 | United Kingdom . |
| 2067608 | 1/1980 | United Kingdom . |

Primary Examiner—George H. Miller, Jr.
Attorney, Agent, or Firm—Spencer & Frank

[57] ABSTRACT

An apparatus for measuring a travelling fiber lap prior to introduction thereof into a fiber processing textile machine. There is provided a thickness measuring device contacting the fiber lap for mechanically detecting thickness fluctuations thereof. A first transducer is connected to the thickness measuring device for converting mechanical signals into electric signals representing the thickness fluctuations, and a computer is connected to the first transducer for receiving the electric signals from the first transducer and a display device connected to an output of the computer. There are further provided a weighing device for continuously determining the weight of the travelling fiber lap; a second transducer connected to the weighing device and to the computer for applying thereto signals representing the momentary weight of the fiber lap passing through the weighing device; a first fiber lap advancing arrangement situated upstream of the weighing device for advancing the fiber lap to the weighing device; and a second fiber lap advancing arrangement situated downstream of the weighing device for withdrawing the fiber lap from the weighing device.

5 Claims, 4 Drawing Sheets

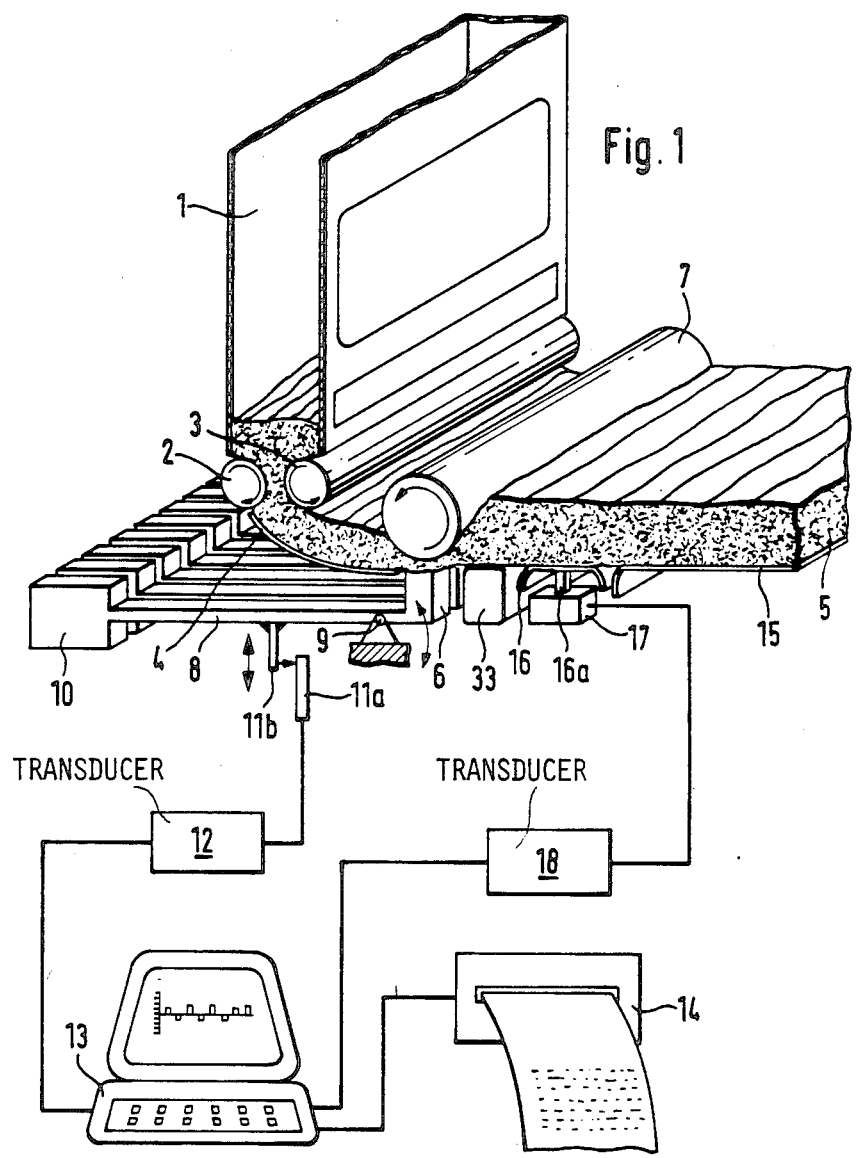

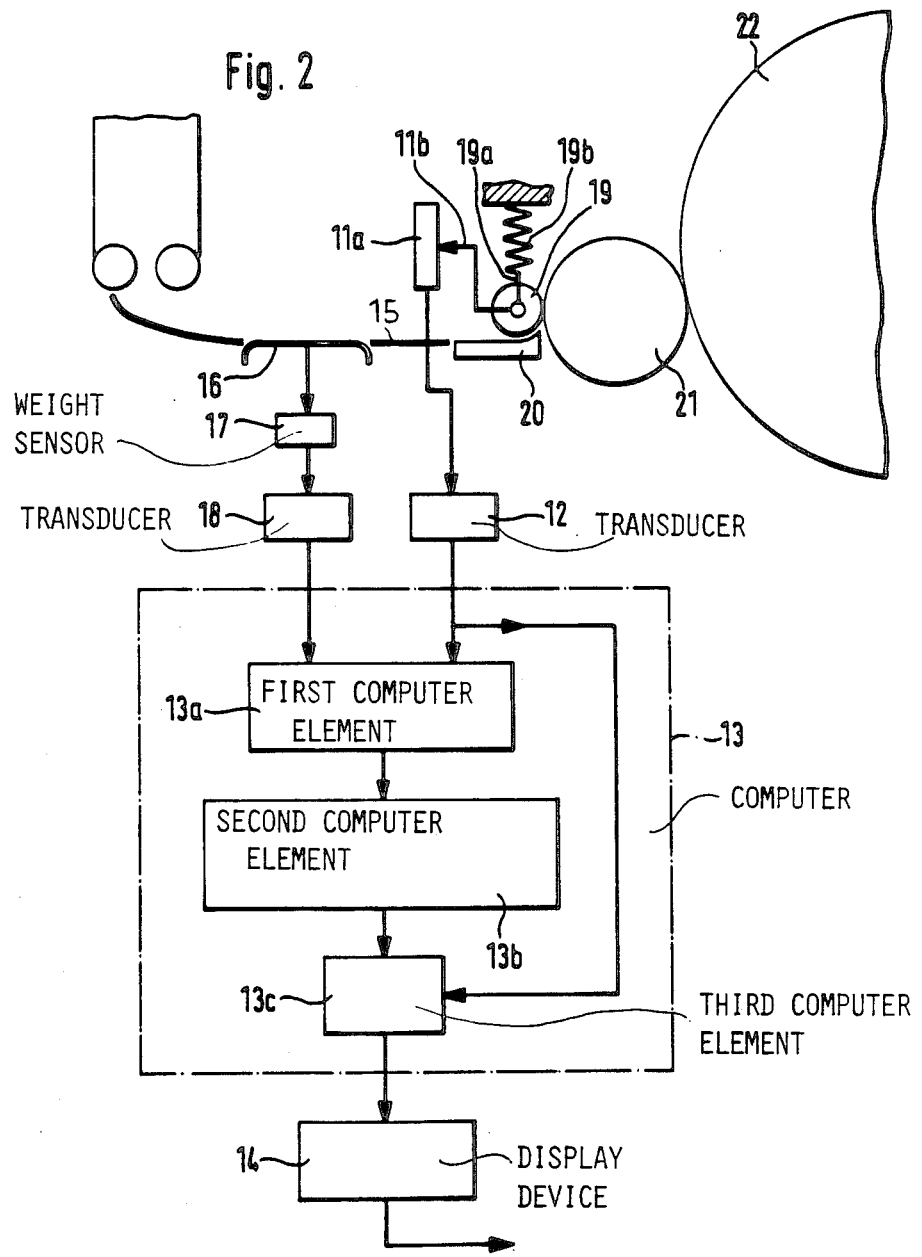

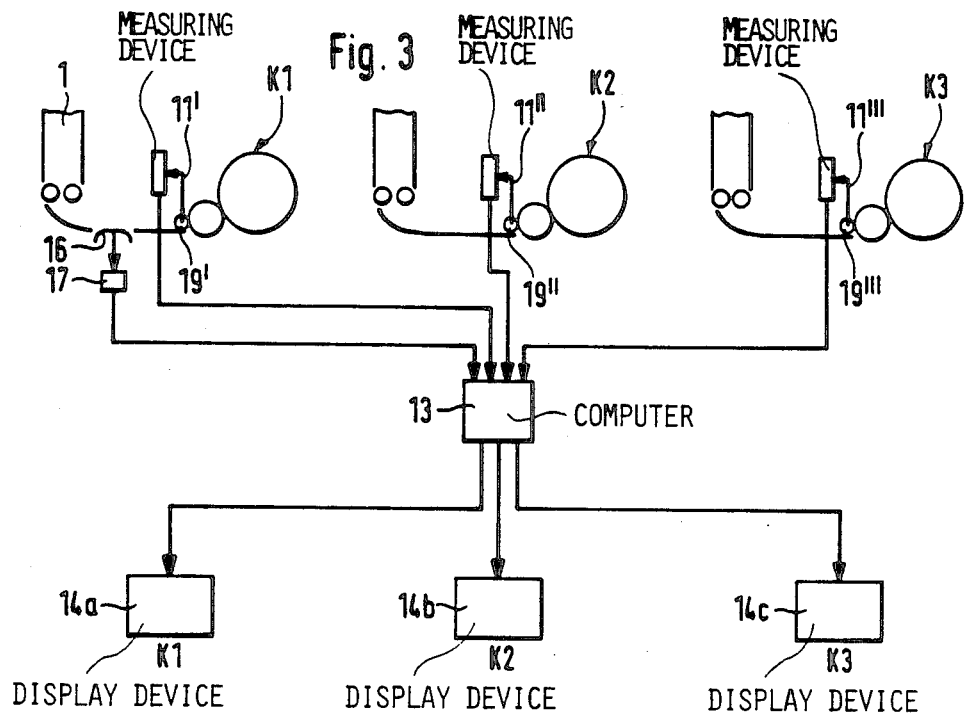
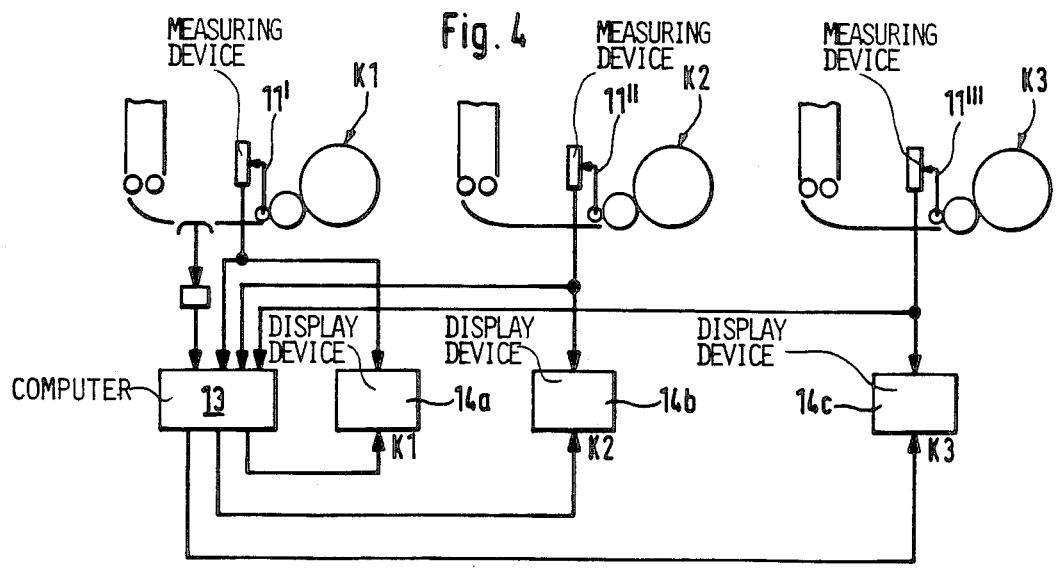

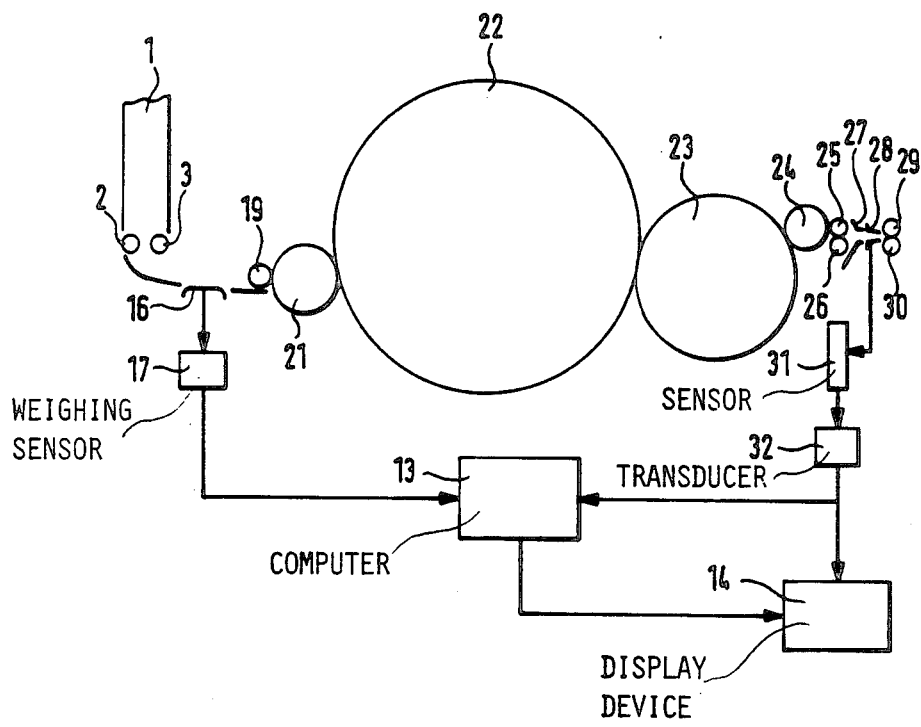

APPARATUS FOR MEASURING QUANTITIES OF FIBER FED TO A TEXTILE MACHINE

BACKGROUND OF THE INVENTION

This invention relates to an apparatus for measuring quantities of fiber forming a fiber lap to be introduced into a textile machine. The apparatus may be of the type which, at several locations along the width of the fiber lap, mechanically detects thickness deviations and, with the intermediary of a transducer, applies the sensed signals to an evaluating computer which includes a display device.

According to a known apparatus of the above type, feeler sensors (pivoted "pedals") which contact one face of the fiber lap, are used directly for detecting the lap thickness. This arrangement is operated under the assumption that the thickness fluctuations correspond to weight fluctuations, that is, only analog values related to weight are obtained. In case of a uniform fiber consistency and otherwise identical production parameters such an arrangement is satisfactory if, for example, the purpose is only a comparison between two tuft feeders rather than an intention to determine absolute weights. In the known apparatus, immediately downstream of the discharge rollers which withdraw the fiber lap from the bottom of the feed chute of the tuft feeder, there is installed a transfer tray which guides the fiber lap to a measuring roller against which the fiber material is pressed by the pedal faces which have a width of, for example, 100 mm. In case of thickness fluctuations in the fiber lap, the pedals— which are uniformly distributed along the width of the fiber lap— undergo corresponding excursions and thus detect the lap thickness. The motions of the pedals are transformed into electric signals by path sensors, for example, plunger coil-plunger anchor units. The electric signals are continuously applied to an evaluating computer. Further, the roller speed is also detected and applied to the computer. For each pedal, the time is calculated which is required for the passage of, for example, a 100 mm length of the fiber lap. The thickness values associated with the time period are integrated over the calculated time. In this manner, there is obtained a mean thickness of a control surface of 100 mm width (that is, the width of the pedal face contacting the fiber lap) and 1 mm length (corresponding to the measuring number). After a measuring path of 100 mm is travelled, a pause follows which is of such a length that in the running direction a distance to the subsequent measured surface is obtained whose magnitude equals the distance between the measured surfaces viewed along the lap width. The measurements are performed in sequence in the running direction at the corresponding distances and, subsequently, the total evaluation takes place. The determined thickness values may be converted into fiber lap weight. This requires a weighing of the entire quadratic surface. For a calibration, such a weight may be brought into relationship with the mean value of all thickness values. It is a disadvantage of this arrangement that the calibration process has to be repeated for each fiber material and each time the production parameters are changed.

SUMMARY OF THE INVENTION

It is an object of the invention to provide an improved apparatus of the above-outlined type from which the stated disadvantage is eliminated and which thus permits a change in the type or consistency of the fiber to be processed or a change in the production parameters without the need for a renewed calibration.

This object and others to become apparent as the specification progresses, are accomplished by the invention, according to which, briefly stated, the measuring device for determining the thickness is associated with a weighing device for continuously weighing the travelling fiber lap prior to its entrance into the textile machine, a first advancing device for feeding the fiber lap to the weighing device and a second advancing device for withdrawing the fiber lap from the weighing device. The weighing device is connected with an evaluating computer with the intermediary of a transducer.

According to a preferred embodiment of the invention, a weighing device and a thickness measuring device (for example, a contact feeler arrangement) or a mass determining device (for determining the density of the fiber lap) are installed in an immediate vicinity to one another in such a manner that the fiber lap passes through the two systems in short succession. The weight values and thickness (or density) values are stored in the computer and compared with one another. From these values, a weight-related calibration may be automatically effected. The comparisons may be carried out over larger time periods so that the effect of individual control values is less and the accuracy of the calibration is increased. A weight-related calibration includes the following steps: determining the magnitude of the excursions of the measuring device for the thickness fluctuations or the measuring values of the mass determination and assigning a voltage of the evaluating system of the measuring device (sensor); determining the magnitude of the lap weight in magnitude and assigning a voltage of the sensor of the weighing device; comparing the two voltages; and, from the results of the comparison, converting into weight values the values of an analog voltage corresponding to the sensor excursions or the mass and effecting an indication or printout of the weight. In case of fluctuations of the excursions or the mass of the fiber lap, weight fluctuations will be indicated.

By combining the weighing device with, for example, the thickness sensing system, the weighing system, after it has been once calibrated relative to weight, can automatically calibrate the thickness sensing system by means of the computer. The measured weight values are integrated and compared with the integral of the excursions, and a calibrating factor is formed, by means of which the weight may be determined from the excursion. It is an advantage of this arrangement that each individual pedal which is present in a plurality along the width of the fiber lap, may be automatically calibrated. This makes further possible to determine a weight profile along the entire machine width. Even in case of changing the fiber material, one may rapidly produce from the combination after a short calibrating period the longitudinal and transversal profile of the fiber laps with weight data, without effecting separate calibration steps.

By coupling the feeler sensor device (thickness measuring device) with the weighing device, it is thus possible to calibrate the feeler sensor device relative to weight. In this manner, weight-related data concerning the fiber lap width and the time elapsed may be obtained. Such a combination permits, both along the length and the width of the fiber lap, a production of a fiber lap with the narrowest tolerances and the determination of the physical properties with measurements for verification purposes. This arrangement further permits a division of the running fiber lap into small control surfaces and also permits the obtention of direct weight data within the small control surfaces.

According to a preferred embodiment of the invention, upstream of a plurality of carding machines there are arranged separate measuring devices which detect thickness fluctuations and which are connected with the evaluating computer. This arrangement has the advantage that in a carding plant only a single card needs to be equipped with the calibrating system according to the invention and the calibrating values may be applied to all the other cards which have only a feeler sensor system, so that all cards which process the same fiber material may be simultaneously calibrated. In this manner, weight values of the fiber lap are obtained for all cards. Only a single weighing device is used for calibrating a plurality of feeler sensor devices.

According to a further preferred embodiment of the invention, sliver thickness measuring devices (sliver trumpets) for the cards are connected with the evaluating computer by separate transducers. In this manner, there is obtained a direct indication of the sliver weight of the sliver discharged by each particular carding machine.

BRIEF DESCRIPTION OF THE DRAWING

FIG. 1 is a schematic perspective view, with block diagram, of a preferred embodiment of the invention.

FIG. 2 is a schematic side elevational view, with block diagram, of another preferred embodiment of the invention.

FIG. 3 is a schematic side elevational view, with block diagram, of still another preferred embodiment of the invention.

FIG. 4 is a schematic side elevational view, with block diagram, of a further preferred embodiment of the invention, similar to the embodiment according to FIG. 3.

FIG. 5 is a schematic side elevational view, with block diagram, of still a further preferred embodiment of the invention, similar to the embodiment according to FIG. 3.

DESCRIPTION OF THE PREFERRED EMBODIMENTS

Turning to FIG. 1, there is illustrated therein a feed chute 1 of a pneumatic fiber tuft feeder which is arranged upstream of a card or a roller card unit for supplying the latter with a fiber lap 5. At the lower end of the feed chute 1 there are arranged two cooperating discharge rollers 2 and 3 which withdraw the fiber lap from the feed chute and below which there is arranged a feed table 4 for guiding the fiber lap 5 towards the card. Immediately downstream of the feed table 4 there are provided a plurality of pedal feelers 6 in a closely spaced series along the width of the fiber lap 5. The position and shape of the pedal feelers 6 are of importance: they engage from below underneath a stationarily supported, rotatable, driven or non-driven support roller 7 to ensure a reliable pressing of the fiber lap against the support roller 7. Each pedal feeler 6 is carried at one end of an arm 8 which is pivotal in a vertical plane about pivot 9 and which carries a weight 10 at its other end to impart a counterclockwise force about the pivot 9. Instead of a weight 10, a spring may be used.

Between the pivot 9 and the weight 10, on each lever arm 8 there is arranged a sensor 11 which may be formed, for example, of a sliding resistor 11a and a slide contact 11b cooperating therewith. Instead of components 11a, 11b a plunger coil and a plunger armature may be used. Each sensor 11 is connected with a transducer 12 (electric mean value forming device with measuring value preparation). The transducer 12 is connected with a computer 13 which, in turn, is connected with a display device 14, such as a printer, screen or the like. The computer 13 may be a 8032 model, manufactured by Commodore GmbH, Frankfurt a. M., West Germany.

Immediately downstream of the pedal feelers 6 there is arranged a support element 33 which extends along the width of the fiber lap 5. Downstream of the support element 33 there is arranged, at a distance therefrom, a stationary support table 15. In the clearance between the support element 33 and the support table 15 there is positioned a weighing plate 16 which is, with the intermediary of a holding element 16a, connected with a sensor 17 which may be of the type having weighing cells operating on expanding measuring strips. The sensor 17 is connected with a transducer 18 which, in turn, is connected with the computer 13. The transducer 18 serves for the measuring value preparation for processing the electric signals in the computer 13 and to form a mean value in case a plurality of weighing plates 16 with associated sensors 17 are used over the width of the fiber lap.

Turning now to the embodiment illustrated in FIG. 2, downstream of the support table 15 there is provided a lap feeding device formed of a feed roller 19 and a feed table 20. Immediately downstream of the lap feeding device 19, 20 there are arranged a lickerin 21 and the main cylinder 22 of a card. The feed roller 19 is floatably supported by a holding element 19a and a spring 19b so that thickness fluctuations of the fiber lap 5 passing between the feed roller 19 and the stationary feed table 20 may be detected as a function of the displacement of the feed roller 19. To the feed roller 19 there is connected a sliding contact 11b which moves as a function of the excursions of the feed roller 19 and which cooperates with a slide resistor 11a. The latter is connected with a transducer 12 for converting the signals corresponding to the excursions of the feed roller 1 into electric analog signals which, in turn, are applied to the computer 13. The weighing plate 16 is, similarly to the embodiment described in connection with FIG. 1, connected with a sensor 17 which, in turn, is connected to a transducer 18 for converting the signals corresponding to weight fluctuations into electric analog signals and for applying them to the computer 13.

The computer 13 has a first computer element 13a in which, by comparison and long-period observation through integration and routing, a relationship between excursion and weight is determined in an increasingly accurate manner. In a second computer element 13b of the computer 13 there is formed a relationship between the excursion and the weight. The second computer element 13b and the transducer 12 are connected to a third computer element 13c. An indicator device 14 is connected to the computer 13 for recording or displaying the fiber lap weight. The signals of the indicator device 14 may be applied to a further processing device such as an operational data processing apparatus.

The computer 13 performs an additional task inasmuch as the fiber lap 5 is measured in a running condition. During a measuring period, by means of the weighing sensor 17 there is performed a plurality of measurements and the resulting measured data are stored. Then, from the measured data a time integral is formed which is associated with the weight magnitude measured manually during the measuring period. This concludes a weight-related calibration for a timed measurement. In this manner for a determined measuring value a determined associated weight data may be obtained.

Turning now to FIG. 3, in the embodiment shown therein, there are provided three cards $K_1$, $K_2$ and $K_3$ whose respective feed rollers 19a, 19b and 19c are associated with a measuring device 11', 11" and 11"', respectively, for detecting excursions of the feed roller due to thickness fluctuations of the fiber lap 5. Thus, the measuring devices 11', 11", 11"' emit electric signals representing the thickness of the fiber laps 5 for the cards $K_1$, $K_2$ and $K_3$ and apply these signals to the computer 13. With the card $K_1$ there is additionally associated a weighing device having a weighing plate 16 and a weighing sensor 17 which applies to the computer 13 electric signals which represent the weight of the fiber lap 5 fed to the card $K_1$. To the computer 13 there are connected display devices 14a, 14b and 14c which indicate the weight of the fiber laps for the individual cards $K_1$, $K_2$ and $K_3$, respectively.

Turning now to FIG. 4, there is shown an embodiment similar to that of FIG. 3, except that the signal routing is different. In addition to being connected with the computer 13, the display devices 14a, 14b and 14c are also coupled with the associated sensors of the thickness measuring devices 11', 11" and 11"' of the respective individual cards $K_1$, $K_2$ and $K_3$. The computer 13 applies the respective calibration value to the display devices 14a, 4b and 14c.

Turning now to the embodiment illustrated in FIG. 5, there is shown therein a feed chute 1 of a fiber tuft feeding apparatus and a card. The card has, in a conventional arrangement, a feed roller 19, a lickerin 21, a carding cylinder 22, a doffer 23, a stripper roller 24, two crushing rollers 25, 26, a web guiding element 27, a sliver trumpet 28 and calender rollers 29, 30. The sliver (not shown) passes through the sliver trumpet 28 which mechanically senses the sliver thickness. The sensor 31 which is associated with the sliver trumpet 28 and which converts the mechanically measured deviations of the sliver thicknesses into electric signals, is connected with the computer 13 and the display device 14 with the intermediary of a transducer 32. The computer 13 is also connected with the display device 14. Between the discharge rollers 2, 3 of the fiber tuft feeding apparatus and the feed roller 19 of the card there are arranged a weighing plate 16 and a weighing sensor 17, the latter being connected with the computer 13. In this manner, the weight of the sliver may be directly indicated by the display device 14. While the FIG. 5 embodiment shows only a single card, the arrangement shown therein is applicable, similarly to the FIG. 3 system, for a plurality of cards, of which expediently only one card (for example, the card $K_1$) is provided with the weight measuring device 16, 17, while, downstream of each card, for example ($K_1$, $K_2$ and $K_3$) a measuring device 28, 31 for the thickness of the sliver is connected.

In a regulating system of the model "Servolap DC" manufactured by Houget Duesberg Bosson, with one or more $\beta$-ray measuring heads the lap mass is measured prior to introduction into the roller card unit and, as a function of the obtained signal, the intake speed of the roller card unit is varied. This process is complex.

The present disclosure relates to subject matter contained in Federal Republic of Germany Patent Application No. P 35 34 933.6 (filed Oct. 1st, 1985) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In an apparatus for measuring a travelling fiber lap prior to introduction thereof into a fiber processing textile machine; a first direction being parallel to a travelling direction of the fiber lap and a second direction being perpendicular to said first direction; said fiber lap having a width being parallel to said second direction; thickness measuring means extending parallel to said second direction for mechanically detecting thickness fluctuations of said fiber lap at a plurality of locations along the width thereof; first transducer means connected to said thickness measuring means for converting mechanical signals of said thickness measuring means into electric signals representing said thickness fluctuations; computer means connected to said first transducer means for receiving the electric signals from said first transducer means and display means connected to an output of said computer means; the improvement comprising weighing means for continuously determining the weight of the travelling fiber lap; second transducer means connected to said weighing means and to said computer means for applying thereto signals representing the momentary weight of the fiber lap passing through said weighing means; a first fiber lap advancing means situated upstream of said weighing means as viewed in said first direction for advancing the fiber lap to said weighing means; and a second fiber lap advancing means situated downstream of said weighing means for withdrawing said fiber lap from said weighing means.

2. An apparatus as defined in claim 1, in combination with a plurality of fiber processing textile machines; said thickness measuring means comprising separate thickness measuring devices operatively connected to each said textile machine upstream thereof; each thickness measuring device being connected with said computer means; said weighing means consisting of a single weighing device operatively connected to and upstream of a single one of said textile machines.

3. An apparatus as defined in claim 2, wherein each said thickness measuring device is directly connected with said display means.

4. In a carding system including a carding machine having means for producing a sliver; means for feeding a fiber lap to the carding machine; thickness measuring means contacting said sliver for mechanically detecting thickness fluctuations thereof; first transducer means connected to said thickness measuring means for converting mechanical signals of said thickness measuring means into electric signals representing said thickness fluctuations; computer means connected to said first transducer means for receiving the electric signals from said first transducer means and display means connected to an output of said computer means; the improvement comprising weighing means for continuously determining the weight of the travelling fiber lap; second transducer means connected to said weighing means and to said computer means for applying thereto signals representing the momentary weight of the fiber lap passing through said weighing means; a first fiber lap advancing means situated upstream of said weighing means as viewed in an advancing direction of the fiber lap; and a second fiber lap advancing means situated downstream of said weighing means for withdrawing said fiber lap from said weighing means prior to introducing said fiber lap into said carding machine.

5. A carding system as defined in claim 4, wherein said carding machine is present in a plurality; said thickness measuring means comprising separate thickness measuring devices operatively connected to each said carding machine at a sliver discharge end thereof; each thickness measuring device being connected with said computer means; said weighing means consisting of a single weighing device operatively connected to and upstream of a single one of said carding machines.

* * * * *